(12) United States Patent
Glaser

(10) Patent No.: US 9,973,403 B2
(45) Date of Patent: May 15, 2018

(54) INTELLIGENT TRACES AND CONNECTIONS IN ELECTRONIC SYSTEMS

(71) Applicant: Lawrence F. Glaser, Fairfax Stn., VA (US)

(72) Inventor: Lawrence F. Glaser, Fairfax Stn., VA (US)

( * ) Notice: Subject to any disclaimer, the term of this patent is extended or adjusted under 35 U.S.C. 154(b) by 312 days.

(21) Appl. No.: 14/705,966

(22) Filed: May 7, 2015

(65) Prior Publication Data

US 2016/0020851 A1    Jan. 21, 2016

Related U.S. Application Data

(60) Provisional application No. 61/990,738, filed on May 9, 2014.

(51) Int. Cl.
*H04L 12/26* (2006.01)
*H04L 12/24* (2006.01)

(52) U.S. Cl.
CPC .......... *H04L 43/0811* (2013.01); *H04L 41/24* (2013.01); *H04L 43/12* (2013.01); *H04L 43/50* (2013.01)

(58) Field of Classification Search
CPC .... G01R 31/021; H04L 43/0811; H04L 43/50
See application file for complete search history.

(56) References Cited

U.S. PATENT DOCUMENTS

| | | | | |
|---|---|---|---|---|
| 5,535,322 A | * | 7/1996 | Hecht | G06F 17/30017 705/301 |
| 5,555,542 A | * | 9/1996 | Ogura | H04L 45/00 370/400 |
| 7,987,224 B2 | * | 7/2011 | Nakayama | H04L 12/423 709/200 |
| 2002/0038199 A1 | * | 3/2002 | Blemel | F17D 5/02 702/183 |
| 2004/0025085 A1 | * | 2/2004 | Yoon | H04L 41/22 714/37 |
| 2005/0028115 A1 | * | 2/2005 | Whitefield | G01R 31/31935 716/106 |
| 2006/0039322 A1 | * | 2/2006 | Furse | G01R 31/11 370/328 |
| 2006/0077902 A1 | * | 4/2006 | Kannan | H04L 43/087 370/250 |

(Continued)

*Primary Examiner* — Jermele M Hollington
*Assistant Examiner* — Alvaro Fortich
(74) *Attorney, Agent, or Firm* — Leslie Virany

(57) ABSTRACT

All electronic systems, viewed from a macro-environment perspective, to a network perspective, to devices dependent upon circuit boards and the internal workings of chips, are critically dependent upon simple point to point connections in order to function properly. Connections are represented by cords, ribbons, traces and cat whiskers, to name a few. With this invention, intelligent but independent electronics are added to the connection to uniquely identify the instance of the connection, allowing the electronic system in question to self map down to the least common denominator, the actual connecting means. Using this technique, a system can report its complete topologic map which may then be stored and retrieved or accessed in real time for purpose of repair and reconstruction and most importantly, as a security enhancement.

20 Claims, 4 Drawing Sheets

(56) References Cited

U.S. PATENT DOCUMENTS

| | | | | |
|---|---|---|---|---|
| 2006/0244656 A1* | 11/2006 | Lawrence | ............... | G01S 19/44 |
| | | | | 342/357.29 |
| 2006/0270458 A1* | 11/2006 | Watanabe | .............. | G08C 17/02 |
| | | | | 455/562.1 |
| 2007/0102188 A1* | 5/2007 | Glew | .................... | H01B 7/295 |
| | | | | 174/113 C |
| 2007/0118319 A1* | 5/2007 | Pillin | ................... | G01R 31/007 |
| | | | | 702/108 |
| 2010/0198504 A1* | 8/2010 | Samsalovic | ............ | G01C 21/32 |
| | | | | 701/408 |
| 2010/0316372 A1* | 12/2010 | Chang | ............... | H04B 10/0771 |
| | | | | 398/12 |
| 2012/0030268 A1* | 2/2012 | Liu | ........................ | G06F 7/588 |
| | | | | 708/254 |
| 2012/0048591 A1* | 3/2012 | Gareis | ................. | H01B 7/0823 |
| | | | | 174/102 R |
| 2013/0039624 A1* | 2/2013 | Scherer | ................. | H01R 9/032 |
| | | | | 385/92 |
| 2013/0254746 A1* | 9/2013 | Balakrishnan | ...... | G06F 11/3608 |
| | | | | 717/124 |
| 2014/0108544 A1* | 4/2014 | Lewis | .................... | H04W 4/02 |
| | | | | 709/204 |

\* cited by examiner

INTELLIGENT TRACES AND CONNECTIONS IN ELECTRONIC SYSTEMS

TECHNICAL FIELD

The technical field applicable to this invention include the fields of electronics, electronic systems, electronic and fiber optic circuitry and networks.

BACKGROUND

Electronic systems require connections between system components, internal to the various components of the systems and within micro-components including within the semiconductor chip, in order to function. Connectivity is required to deliver power, move data, emit or collect signals (transmission lines) and other required functions one of skill in the art would be very familiar with and can appreciate.

The least common denominator connective components in an electronic system, such as a patch cord or ribbon cable, are usually comprised of straight pathways of electrically conductive material such as copper, or photonic conductive fiber optic material with connectors at the ends so the manufacturer or technician can make or break a connection and replace the connector when it is worn, suspect or known to be defective. This includes the micro connections found within circuitry, including the internal portion of a chip, which are normally manufactured so as not to be easily accessed for repair or replacement.

The disadvantage of this design is, any break in any one given connection is not always universally detectable. If the connection is broken, for any reason, the system will suffer and security has been compromised. Also, security compromise is very easily and readily accomplished as these connections and the connective material are not self-alarmed, monitored or "smart" in any meaningful context.

A solution is proposed here to tighten security, provide real time notification of a break of any one connection in a system, providing identity of the actual unique connector which was compromised, disconnected or is defective. The material between points is also made "smart" in the context of this invention, to further pinpoint a compromise of any kind, or a defect and to facilitate auto-mapping functions. This solution leads to new features not previously seen in other systems.

DESCRIPTION

The connectivity between any two discrete points in an electronic system which is represented by a trace, cat whisker, patch cord, ribbon cable or other forms of point to point connectivity, is hereinafter equipped with a scavenging electronic communications device capable of scavenging power, so the device can operate independently of its host and without deleterious effect upon the host, engineered so the device can communicate with all other like devices and any monitoring network, software, application (hereinafter referenced as "app or apps") or server.

The device is replicated at each end of the pathway. Upon power up, which may use the device' own proprietary in band or out of band communications, each device can auto-generate and pass its own unique identifier. As such, the devices can also identify the unique instance of the connection means, such as a patch cord or trace. Hence, up to every cord and trace is uniquely known through the use of this method. In a further enhancement, the circuitry which generates the unique identifier (fixed) may also have TDR (Time Domain Reflectometer) or OTDR (Optical Time Domain Reflectometry) functionality, end to end. It may be preferable for the device to generate more than one unique identifier and man randomize the unique identifiers so as not to use the same fixed unique identifier, over and over. It may be preferable to require a logging procedure with encryption or, a priming station such as a portable hand held device, to set the unique IDs into the patch cord, for example, which includes the concept of polarity, recognizing one end from the other and providing each end with a unique identifier.

With an electronic system or device maximally equipped with this invention, servers or networks which are intended to monitor health, status and configuration(s) can map the system in question down to its lowest common denominator, in terms of what the technician and user will most likely have access to and be able to manipulate. Technicians and users manipulate connections to achieve reconfiguration, relocation of devices, testing, repair and other necessary work. Sometimes, however, the effort may represent a clandestine attempt to gain access to a system for nefarious purposes. This invention is intended to guard against this.

Having a real time generated map, and knowing the status and whereabouts of the least common denominator(s), the patch cable (for example), allows for many new features to be provided to the technicians, users and their security conscious staff. Maps of all the connections are now fully complete and utterly accurate. Each cord is known as to its identity and what each end of the cord is connected to. The lengths of the cords down to a very critical accuracy can be known if the cords are equipped with TDR or OTDR functionality. As such, indicators and displays can be added anywhere on any system component, to assist with directing staff to the place the plug where it must go, or where one is to remove a plug or connection to or from. Simple color coding or a more complex graphic depiction on a portable device with display (cell, tablet, lap-top) may also be used to perform this function. Equally, a test apparatus or even a wireless mobile device with connectors on it and a display, can tell which instance of a connecting cable you have plugged into the test apparatus' connector (or mobile device "test"), or where that end must go next, both in terms of displaying a topological mapping or other logical map with indicator telling where to place the connector, or, causing a light or other indicator to illuminate or flash where the plug goes within a given domain of a system. Interestingly, connecting one end can provide length data and the guidance software can tell the user or technician if the cord in question is too short for clean routing, or too long, suggesting another cord which may be accessed in an inventory, assuming all cords do carry a physical tag with a unique identifier for the cord, not to be confused with the electronic unique identifiers held inside which may or may not correlate or be identical to the markings on the cable. In an embodiment, these markings include Bar Code, Qr or Qc type coding useful for rapid scanning, data base access of the scanned identity and then suggestive instruction based on data known about the object and the task you wish to subject the object to perform.

Real time monitoring of these connectors and the pathways they represent, allows for a more rapid and complete response to failures, damage, security breaches or accidental removal of a connection which was unintentional, and, replacement of the suspect or known faulty or breeched connector(s) or cord(s) so as to restore the proper connectivity and order to the system in question.

Because there will now be a complete and fully automated mapping of a given system, potentially down to its least common denominator connection, inclusive of distances between connection points, reconstruction due to catastrophic recovery, addition, move and change activity and trouble-shooting are all aided by this knowledge. The map which may be automatically generated and thus always up to date, will prove to be utterly accurate and at all times, so technicians and users do not have to waste valuable resources to maintain drawings, maps, layouts and to print designation markers or tabs, which, in an embodiment, is automatically generated from this wholly accurate map.

Ideally, if each connection point (the device which the invention connects to, such as a simple patch panel or the face of a data switch or router) were equipped with a display, the connection information, in an embodiment, is displayed at that specific display automatically and in real time. If this suggestion is too costly for a given system, a substitution may be preferable where only one or a few displays are present from which the technician or user can query each connection in visible range, as to its parameters and other related information. This raises the important issue that the invention applies to connections, as clearly indicated above, but also applies to test equipment, monitoring apparatus, servers, software and networks which communicate with this new invention, and the invention specifically and expressly implies and covers the novel and unique changes to these peripheral systems which assist in improving the scope and usefulness of the new invention. From a simple patch panel, which may now have multi-color indicators for each connection point, or a display, or both (and some push buttons for functions or feature access and testing), to a router, switch, hub, concentrator, fiber optic transceiver, any network device, even a server, all of the elements found in a system are modified or changed, to accommodate the invention and in return, security is hardened, repair and maintenance utterly simplified and human capital efficiency conclusively will improve to achieve maximum effect.

DETAILED DESCRIPTION OF THE DRAWINGS

For purposes of this document, an 'intelligent pathway' or 'intelligent trace' refers to, respectively, a pathway or trace which is subject to real-time integrity monitoring in the spirit of the present invention, as described in detail according to the various embodiments thereof, below.

Figure 1:
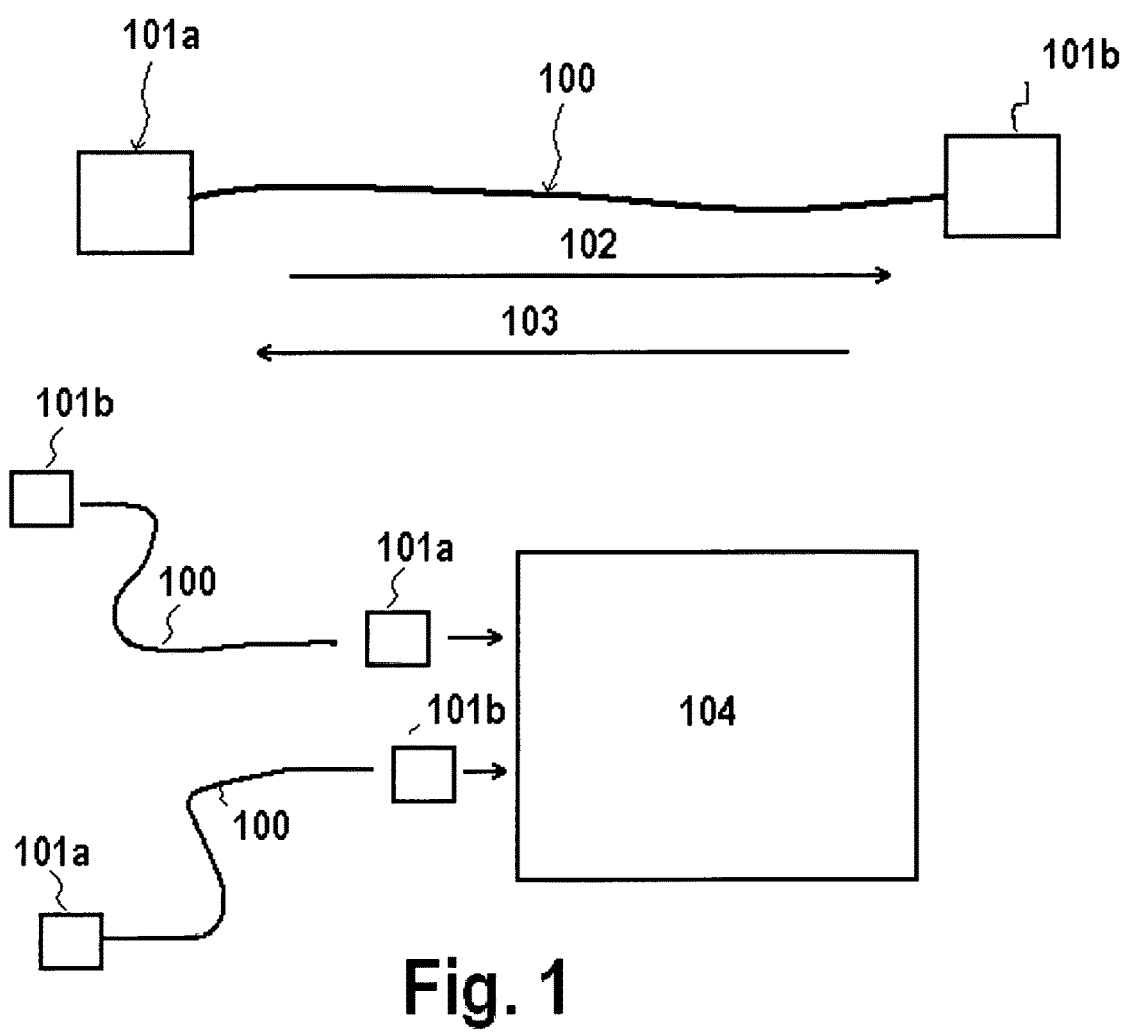
FIG. 1 illustrates a patch cord 100 (fiber, copper or coax, any type of conductor and connectors), connector 101a and 101b at the opposite end of 101a, direction (polarity) of information flow 102 and reverse direction (polarity) of information flow 103, a typical device 104 and some connections of cord 100's to device 104.

Referring to FIG. 1, a Patch cord 100 is shown (fiber, copper or coax, any type of conductor and connectors), connector 101a and 101b at the opposite end of 101a, contain electronic circuitry which is formed of this invention. The circuitry is able to draw its power from the electrical conductors in the cord directly borrowing a small amount of current/electricity, or in a fiber optic line, from the light passing through. The circuit is intended to contain and boot a communications capable transceiver which can either work in band and synchronize with the protocol found on the cable, or, just use the power and work out of band on a circuit that is essentially virtually derived (multiplexed within) the cord. The direction of information flow 102 and reverse direction of information flow 103, are generated by this circuit. Device 104 and some connections of cord 100's to device 104 are shown. The connection will cause the circuitry in cord 100 to initialize and commence communications in any direction on the cord. In an embodiment, the ends of the cord provide unique identifiers according to the direction of information flow, which allows for several pieces of crucial data to be passed, along in the given system or network. This information starts with a unique identifier associated with the unique instance of the cord which may also be marked on its surface with a visible indicator that matches this unique identifier, or, must be cross referenced in a data base in order to know the unique identifier that is emitted electronically as to its relationship with which physical cord while observing the cord or a plurality of cord(s). These specific data, unique identifiers, and also with another form of cord, cord 300, additional data can be enclosed which indicates either the distance between the connectors found on the cord, or, the distance between points in a circuit or system. For example, a unique component in a system may have several cords attached. The cords can communicate with one another and pass the distance data such that the cords know the distance they preside from one another. When the cords communicate with one another, they can store and sequence all their data so an end point gathering the data can make sense of it. This will be further explored below.

Figure 2:
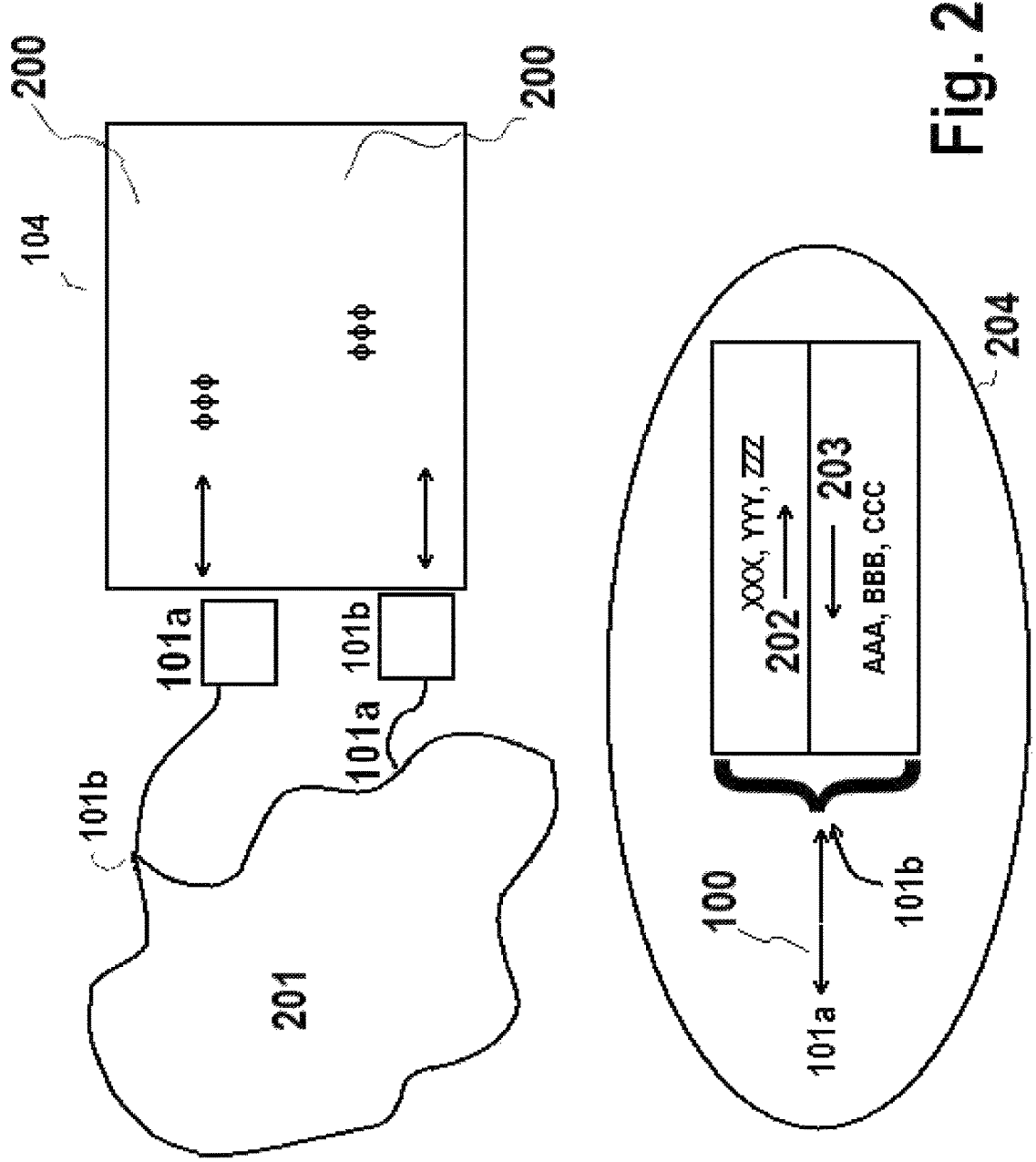
FIG. 2 illustrates a typical device 104, emitting and collecting unique identifiers 200, to or from a system or network 201

FIG. 2 shows a typical device 104, emitting and collecting unique identifiers 200, to or from a system or network 201 passing through connectors 101a and 101 b which are two different cord 100's attached to the same system or network 201. A closer detail of the passing of unique identifiers is shown in detail 204, with inbound unique identifiers from cord 100 and through connector 101b, broken into components 202 inbound showing unique id content xxx, yyy, zzz and 203 outbound, showing unique id content aaa, bbb, ccc. It is easily seen that the protocol will benefit from use of characters indicating space, ignore, end of one item, beginning of a new item, a distance follows this character, a distance precedes this character and so on. The danger in this is for public enemies or wrong doers gaining access to these characters. As such, these characters may not be needed at all and all the data can be appended together in a long statement with no separation provided the unique identifiers are very long numbers which are not only never repeated, but contain key elements on the unique identifier server and data base are aware of. Unique key elements identify the unique identifier and so, the receiver of the data, be it human or a software program, can decipher the beginning and end of that specific unique identifier. In a long string of hundreds of identifiers, there will be no character or space left out in between the string of unique identifiers through using classic search techniques to match up the key elements found in each unique identifier. One could think of this as "a unique identifier generated which will never be repeated and as such, is a very long value such as a number, wherein, around this unique identifier an even larger unique identifier will be built so as to aid the recipient who must then search the entire unique identifier for a match". The idea is, to search a very large string for a match within less of its successive characters takes less time than using a more disparate unique identifier or breaking it up so its not sequential within the larger string, such as encrypting it within Trojan data requiring yet more software to remove Trojan data. The structure of the xxx, yyy, zzz and aaa, bbb, ccc data strings will be further explored below. It is not intended to limit to the use of three characters or three successive blocks of three characters, rather, the idea is with today's ultra fast networks and powerful search and memory functions, we can make this very large numbers and make the process of intrusion very difficult, if not, impossible.

Figure 3:
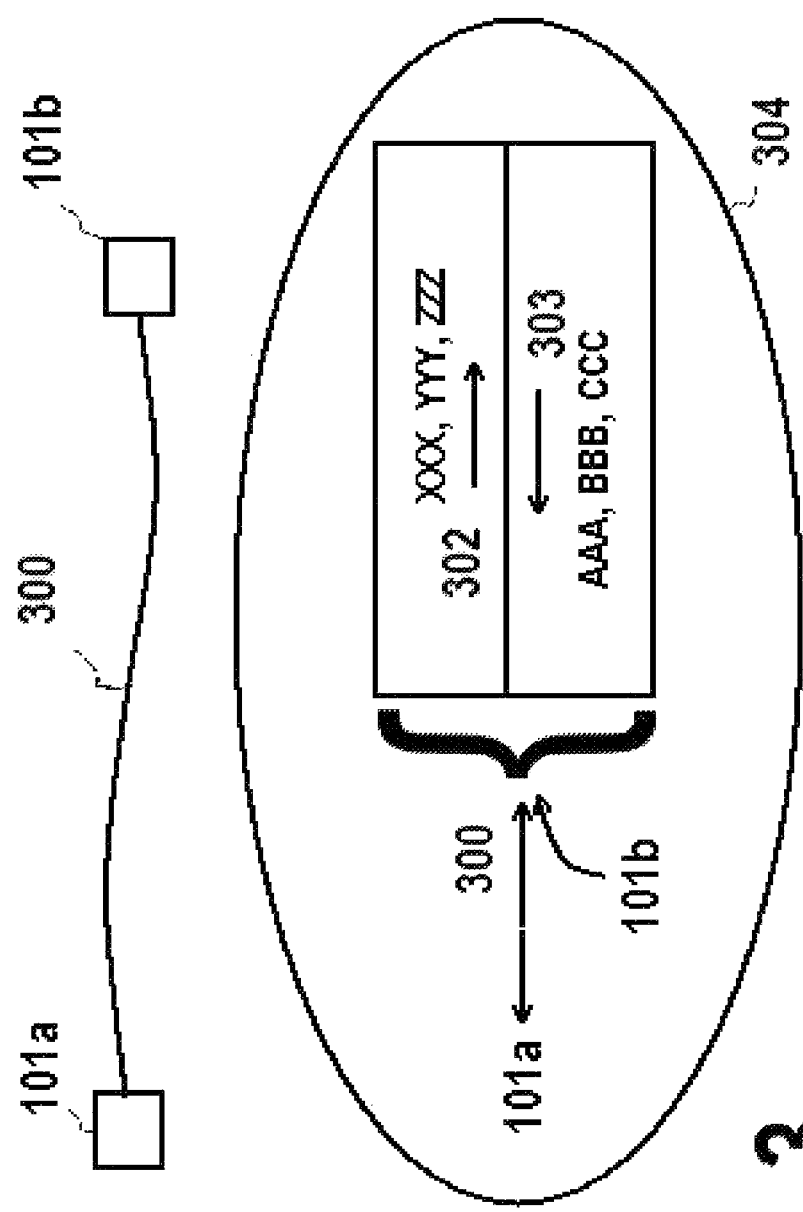
FIG. 3 illustrates a system resembling the invention as depicted in the previous figures, additionally incorporating TDR or OTDR equipped cord 300.

FIG. 3 The figure introduces cord 300, which is a TDR or OTDR equipped cord. Similar to FIG. 2, where the inbound and outbound unique identifiers are explained, broken into components 302 inbound showing unique id content xxx, yyy, zzz including a distance value between two points vvv and 303 outbound, unique id content aaa, bbb, ccc including a distance value between two points ttt. Not shown is the circuitry as its design is essentially considered public domain and the functions as well as designs will not be novel. It is more preferably the whole of this invention which is quite novel, unique, and not found in the public domain. For example, to have a complete topology of an entire system inclusive of patch cords and patch panels, as well as connections inside of system components and the lengths of these patch cords as well as their true identities, it would take human intervention, a very "all encompassing" drawing such as CAD/CAM and a vast plurality of man-hours to input and then maintain such a database, and thereafter, there is no assurance at all, what is in the field actually matches what would be found in this data base because it would be so difficult to create and then manage, logically, it would probably never match the field configuration at all. In the context of a typical building or campus wide network, unless the closets were welded shut and no change was allowed to be administered during the weeks, months or years it would take to create so detailed a drawing, its not reasonable or logical to think one could ever make a drawing this detailed. However, with this invention, not only is the drawing provided most likely with less than a few seconds of propagation delay, once up and running, any tiny change or failure, intrusion or unplugging would trip an alarm without latency or delay. The elimination of delay or latency happens because the alarms come when the system is in service, in a static condition. With no change in the system, the alarm is the only new data and it can be sent along its own unique pathway to avoid contention or delay. Eg in a router world, this is simply a higher routing class assuring zero latency.

Figure 4:
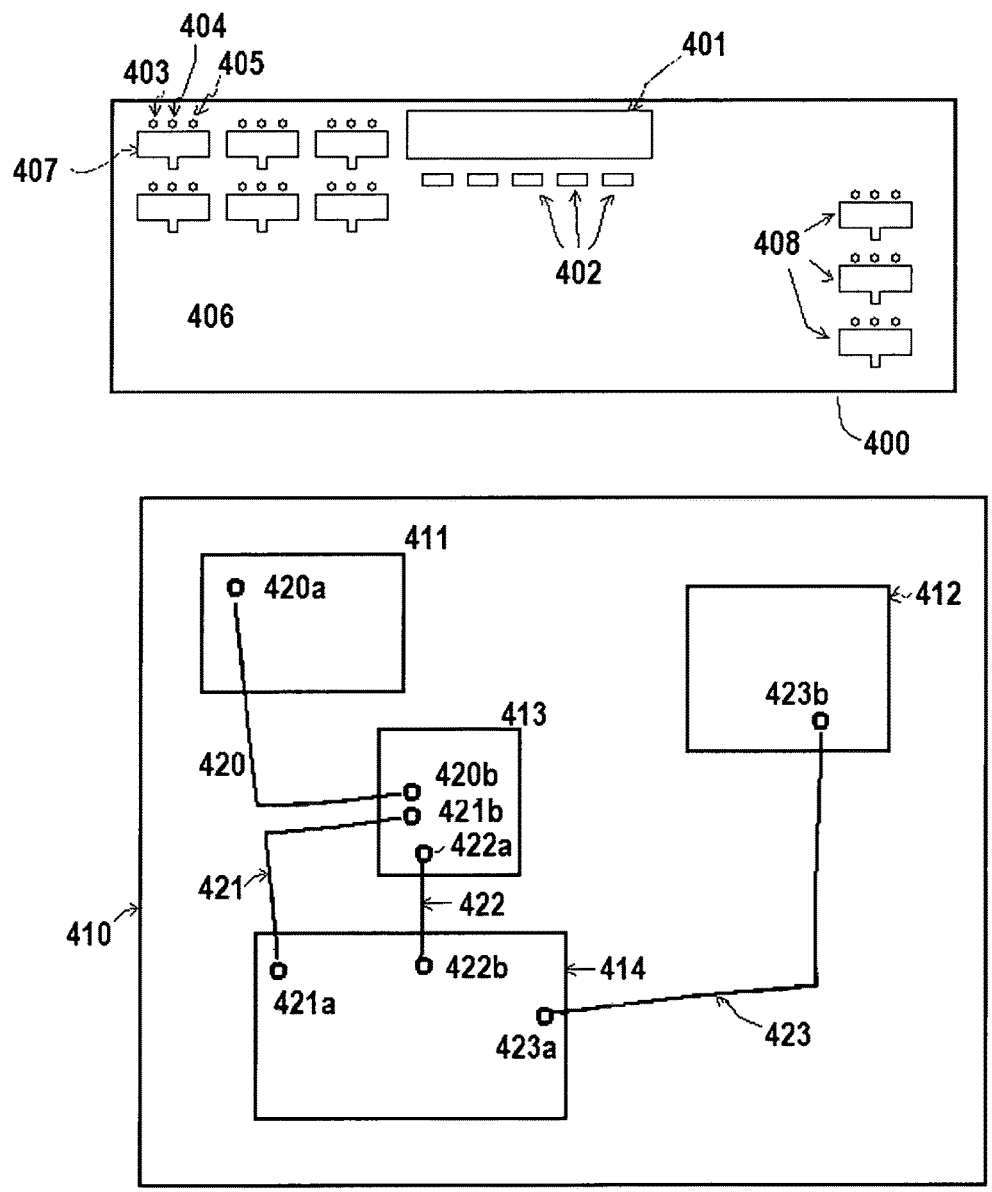
FIG. 4 The (not-to-scale) figure introduces, to the invention as depicted in the previous figures, Patch Panel 400, with ports (or sometimes referenced as patch panel positions) 407, 408, led indicators on position 407

FIG. 4 The figure introduces Patch Panel 400, with ports (or sometimes referenced as patch panel positions) 407, 408, led indicators on position 407 depicted as LED color 1—403, LED color 2—404 and LED color 3—405. The Leds will most likely be red, amber and green in no particular order, however, whatever the order, it should be re-used for all such positions and ports, universally. So most likely, green, amber and red, in that order as it equates to the street light concept of go, slow down and stop (or "no") The patch panel 400 has a display 401, which may be monochrome, color, and/or touch-enabled. Also there are feature access buttons which will be programmable and may programmably access information shown on display 401 or initiate changes or tests, display information pertinent to this patch panel or other devices connected to the panel or connected to a network accessible through the panel. If a test jack is designated, it could be rimmed with a red plastic rim so technicians can find it fast, or a fluttering LED, such as a fluttering green with a high rate that is at least 4 times higher than any other flutter rate in a given environment, so a technician can find it fast. The context of this is RJ45 1000 Base T Cat 6 cabling as illustrated, but those of skill see this could equally apply to any low voltage wiring such as coax, lower or higher categories of 8 conductor wiring (or other conductor counts) and fiber optic cabling. Leds could be associated with the feature buttons (not shown). Graphic 410 is a block diagram of various system components 411, 412, 413, 414 which have been interconnected by specific cords 420, 421, 422 and 423. The cords thus create end points 420*a* and *b*, 421*a* and *b*, 422*a* and *b* and 423*a* and *b*. An embodiment of the invention is intended to map the entire system with components shown as they actually are, scaled down or up as desired, and in 3-D or 2-D, which can include the actual appearance of patch panels, the patch cords deployed, the markings found on the patch cords and all the known distances properly scaled. Block diagrams are the most commonly used because one can crunch the drawing to fit a sheet or paper or a screen and not worry as much about scaling. In this manner, more information fits on a small screen. App development for portable devices is also aided with this method, as the tech or user in the field will benefit from more information being made available on less size or type screen for the typical portable device. Discussed above, and discussed again here, in this particular drawing, the unique identifiers of each system component 411, 412, 413, 414, and the distance between the connections to these system components, the unique identifiers associated with cords 420, 421, 422, 423 and the polarity of the ends, 420*a*, *b*, 421*a*, *b*, 422*a*, *b* and 423*a*, *b* can all be communicated from or to any point in this system when there is a verification server (not shown) available to collect the data strings. As described above, use of very large numbers is but one way to string together all the unique identifier information so the verification server can conduct a search on an inbound string. Strings will arrive with no begin or end character, yet, memory will show no data preceding and no data following a complete string, providing enough information to cause a memory holding the entire string to commence truncating off the space and analyzing the content of the very long number contained in a single large string. The key (sub) unique identifiers provide identity of the long form unique identifier which surrounds the key unique identifier, allowing the verification server to split apart all the unique identifiers leaving only the distance values intact, and preserving the order of all elements received in the string. Therein, by knowing from which connection this string was received, the verification software (server) can reconstruct the entire system if it has associated each component of the system in its data base as a prerequisite. Since manual connections and cords greatly outnumber the system components found in a network, one could manually enter the system components first, to then get the assignments of the unique identifiers for these components which will remain permanently assigned. Then, one could simply do the job of running all wire, cable, and cross connecting it with the cords of the invention, thereafter turning up components either all at once or in any order the installer wishes. When all items are powered, all the strings arriving will be deciphered and the map will be drawn. The map can be drawn accurately because the unique identifiers of the system components were manually manned in first, hence, when the string is deciphered, the system components are known as to their presence and order along the string, leaving only the cords and their lengths. Even if two cords are back to back, or three, or a vast plurality, so long as a distance limitation of the underlying communications technology is not broken or violated, and any phantom power provided (such as POE, Power Over Ethernet) this solution will function automatically, as described herein. A system size matching all the networks in place on the planet, could report their connection and topology in seconds, assuming that the latest system components are installed to provide an intrinsic giga speed backbone. This is an astonishing feat when one thinks about it. No more manual drawings or record keeping . . . this system provides sufficient detail for the most stringent of requirements.

Many modifications and other embodiments of the disclosure will come to mind to one skilled in the art to which this disclosure pertains having the benefit of the teachings presented in the foregoing descriptions and the associated drawings. Therefore, it is to be understood that the disclosure is not to be limited to the specific embodiments disclosed herein and that modifications and other embodiments are intended to be included within the scope of the appended claims. Although specific terms are employed herein, they are used in a generic and descriptive sense only and not for purposes of limitation.

Individuals of skill, once reviewing this invention with particularity to the network structures, isolation of certain servers, use of software and placement of legacy and new devices, will see there are further permutations in practicing the use of these teachings. Accordingly, not every possible use or layout is shown, yet the invention is applicable to any and all electronic and fiber optic networks currently in use.

I claim:

1. A self-monitoring network system comprising
physical cords or cable completing, at least one connection point, a real-time monitored pathway connecting, through a connector, at least one pair of compatible electronic communications devices scavenging power to perform monitoring functions;
a first electronic unit making a determination whether a direction of a signal travelling on said pathway is transmit to receive or receive to transmit; and
a second electronic unit calculating distance along said pathway according to said determination wherein said monitoring functions comprise steps of generating and passing in real time said at least one unique identifier and a unique distance data identifier in the transmit to receive direction indicating each end point to form a logical map containing and correlating the status and whereabouts of said pathway.

2. The system of claim 1 further comprising
a display of a topological mapping based on said logical map, said display indicating where to place the connector.

3. The system of claim 2 further comprising a circuit unit adapted to generate said map automatically.

4. The system of claim 3 wherein said pathway comprises a trace, cat whisker, patch cord, ribbon cable or other forms of point to point connectivity.

5. The system of claim 3 further comprising a circuit unit providing real time notification of a break of at least one said pathway,
provide the identity of the actual unique connector which was compromised, disconnected or is defective and;
provide information to aid in determining the location of a compromise or a defect.

6. The system of claim 3 wherein said second electronic unit calculating distance along said pathway further comprises a TOR (Time Domain Reflectometer) or OTDR (Optical Time Domain Reflectometry) functionality, end to end.

7. The system of claim 6 wherein said distance is measured between connectors found on the cord.

8. The system of claim 6 wherein said distance is measured between points in a circuit or system.

9. The system of claim 3 further comprising a circuit unit adapted to generate more than one unique identifier and to randomize the unique identifiers.

10. The system of claim 3 further comprising a logging unit with encryption.

11. The system of claim 3 further comprising a priming station such as a portable hand held device, to set said unique IDs into a patch cord or read them from a patch cord.

12. The system of claim 3 wherein said pathway is micro-miniaturized and embedded within a microchip so as to allow the microchip to provide topologically and anatomically correct self mapping information.

13. The system of claim 10 further comprising guidance software.

14. The system of claim 3 wherein said pathway comprises a cable further comprising markings.

15. The system of claim 14 wherein said markings comprise Bar Codes, Qr or Qc coding.

16. The system of claim 3 wherein at least one said communication device is further connected to a device selected from the list of test equipment, monitoring apparatus, servers, software and networks.

17. The system of claim 14 wherein said cable comprises RJ45 1000 Base T Cat 6 cabling.

18. A real-time self-monitoring electrical pathway connector for a pair of compatible electronic power-scavenging communications devices connected by a plurality of pathways, each of said devices comprising;
a first electronic unit making a determination whether a direction of a signal travelling on said pathway is transmit to receive or receive to transmit; and
a second electronic unit calculating distance along said pathway according to said determination and encoding said distance into a unique identifier;
a third electronic unit to generate and pass to the other said unique identifier from each end point of each said pathway, said unique identifier including a direction and a distance between connection points; and
a fourth electronic unit to automatically assemble a mapping of each element of each connection along said pathway.

19. The electrical pathway connector of claim 18 wherein said cable comprises RJ45 1000 Base T Cat 6 cabling.

20. The electrical pathway connector of claim 18 further comprising
said first electronic unit making a determination whether a direction of a signal travelling on said pathway is transmit to receive or receive to transmit;
said second electronic unit calculating distance along said pathway according to said determination wherein
said third electronic unit to generating and passing in real time said unique identifier and said unique distance data identifier in the transmit to receive direction indicating each end point to form a logical map containing and correlating the status and whereabouts of said pathway; and
a logging unit with encryption.

* * * * *